(No Model.)
E. HENN.
HEATING STOVE.
No. 382,158. Patented May 1, 1888.
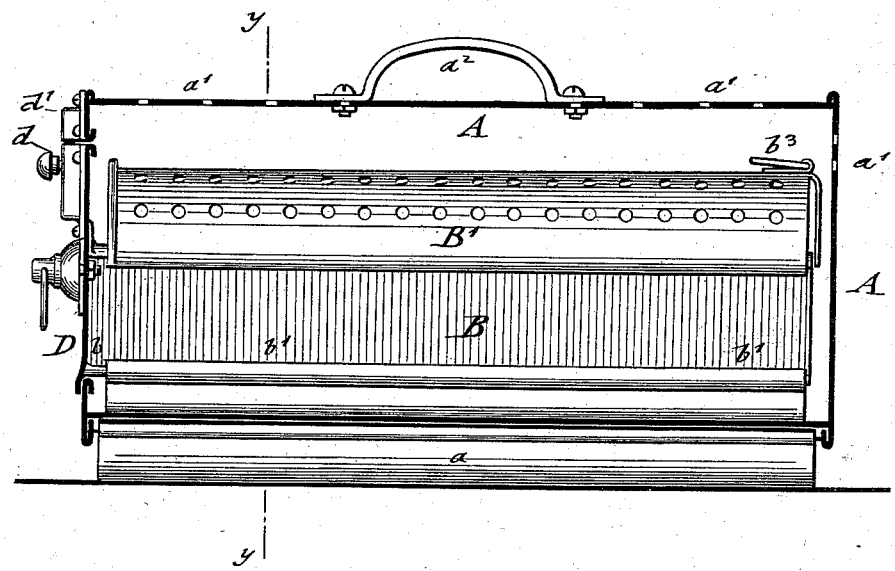
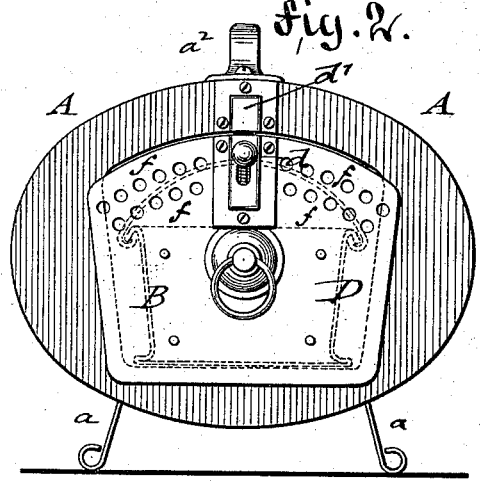
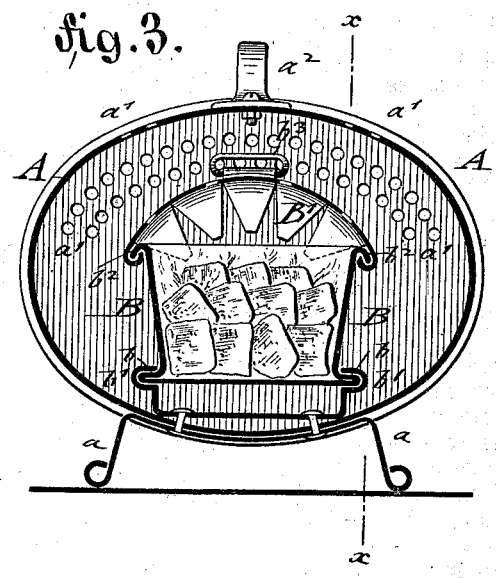
WITNESSES:
Col. N. Rosenbaum.
Martin Petry.
INVENTOR-
Eduard Henn.
BY
Goepel & Raegener
ATTORNEYS.

UNITED STATES PATENT OFFICE.

EDUARD HENN, OF JERSEY CITY, NEW JERSEY.

HEATING-STOVE.

SPECIFICATION forming part of Letters Patent No. 382,158, dated May 1, 1888.

Application filed March 3, 1887. Serial No. 229,527. (No model.)

*To all whom it may concern:*

Be it known that I, EDUARD HENN, of Jersey City, in the county of Hudson and State of New Jersey, have invented certain new and useful Improvements in Heating-Stoves, of which the following is a specification.

This invention is designed to furnish an improved heating-stove for street-cars, greenhouses, bath-houses, &c., in which the heat is produced by slowly-burning fuel that requires no shaking off of the ashes and that produces a steady and intense heat; and the invention consists of a heating-stove composed of an exterior shell or casing provided with air openings at the top and ends, and of an interior fire-pan that is guided in ways of the shell and provided with an adjustable perforated guard-cover, said fire-pan being provided with a head-plate that is locked to the shell, so as to close the end opening through which the fire-pan is inserted into the shell. The head-plate has two series of air-openings, one series communicating with the interior of the fire-pan and the other with the space between the same and the shell.

In the accompanying drawings, Figure 1 represents a vertical longitudinal section of my improved heating stove on line $x\,x$, Fig. 3. Fig. 2 is an end elevation; and Fig. 3, a vertical transverse section of the same on line $y\,y$, Fig. 1.

Similar letters of reference indicate corresponding parts.

Referring to the drawings, A represents the outer shell of my improved stove, which shell is preferably made of suitable sheet metal, of oval or other shape, and supported in horizontal position on legs $a\,a$, as shown clearly in Figs. 2 and 3. The shell A is provided with air-openings $a'\,a'$ in the top and ends, and with a handle, $a^2$, that is riveted to the top part of the shell to facilitate the lifting and removing of the stove for charging and replacing the same. One end of the shell A is provided with an opening of sufficient size to insert a fire-pan, B, which is guided by bottom flanges, $b$, in fixed longitudinal ways $b'$ at the interior of the shell A, as shown clearly in Fig. 3. The upper edges of the fire-pan B are provided with outwardly and downwardly bent flanges $b^2$, on which is guided a detachable perforated guide-cover, B', which has handles $b^3$ at one or both ends for sliding said cover on the fire-pan and facilitating the charging of the same and the removing of the ashes. The cover B' serves as a safety device for preventing the scattering of the fuel in case the stove should be upset for some reason or other, so that any danger of fire is prevented. The end of the fire-pan B is provided with a head-plate, D, that is made of larger size than the opening in the end of the shell A, so as to close said opening when the fire-pan is in position. A spring-latch or other locking device, $d$, is applied to the head plate, D, of the fire-pan, and a keeper, $d'$, to the end plate of the shell, as shown in Fig. 2, the locking device $d\,d'$ serving to lock the fire-pan reliably in position in the shell. A handle, $e$, attached to the head-plate D facilitates the removal of the fire-pan from the shell for removing the ashes and charging the fire-pan again with fuel. The head-plate D is provided with two series of holes, $f\,f$, the upper series supplying air to the space between the guard-cover of the fire-pan B and the top of the shell A, while the lower series of holes supplies air to the upper part of the fire-pan, so that the air can pass over the surface of the fuel in the fire-pan, and produce thereby the slow combustion of the fuel. Any fuel composition that is capable of slow combustion may be used with my stove; but I prefer to use the fuel composition for which Letters Patent have been granted to Charles Siedhoff July 13, 1886, No. 345,329, one charge of which burns, according to the size of the heater, from twenty to twenty-four hours before recharging is necessary. The heat generated by the slowly-burning fuel composition heats up the air in the outer shell, which rises thereby and heats the car or room in which the stove is placed. As the fuel composition produces no smoke or ill-smelling gases, the same is unobjectionable and can be used for various purposes, mainly, however, for street-cars, greenhouses, and also in a smaller size as foot-warmers for carriages and for similar applications.

Having thus described my invention, I claim as new and desire to secure by Letters Patent—

The combination of an outer shell having a large opening at one end and air-holes in the top and ends, fixed longitudinal guideways at the interior of the shell, a fire-pan provided with bottom flanges and an adjustable and perforated guard-cover, a head-plate attached to one end of the fire-pan and made of a larger size than the end opening of the shell, said head-plate being provided with two series of air-openings, so as to supply air to the interior of the fire-pan and to the space between the same and the shell, and a locking device for locking the fire-pan in position in the shell, substantially as set forth.

In testimony that I claim the foregoing as my invention I have signed my name in presence of two subscribing witnesses.

EDUARD HENN.

Witnesses:
MARTIN PETRY,
CHARLES FLEISCHACKER.